United States Patent [19]

Okada et al.

[11] Patent Number: 4,479,618
[45] Date of Patent: Oct. 30, 1984

[54] TAPE CASSETTE ADAPTER

[75] Inventors: Takehiro Okada, Neyagawa; Masataka Izaki, Yawata; Jirou Kajino, Neyagawa; Toshibumi Kamiyama, Tsuyama, all of Japan

[73] Assignee: Matsushita Electric Industrial Co., Ltd., Osaka, Japan

[21] Appl. No.: 447,898

[22] Filed: Dec. 8, 1982

[30] Foreign Application Priority Data

Dec. 14, 1981 [JP] Japan .................. 56-202198

[51] Int. Cl.³ .................. G03B 1/04; G11B 15/32
[52] U.S. Cl. .................. 242/200; 360/94
[58] Field of Search .................. 242/180, 197–200; 360/85, 93, 94, 95, 96.5, 132

[56] References Cited

U.S. PATENT DOCUMENTS 3,404,545 10/1968 Walker .
3,868,119  2/1975 Frisco ................. 279/16
3,964,099  6/1976 Sato ................... 360/94
4,183,477  1/1980 Iwase et al. .......... 242/198

FOREIGN PATENT DOCUMENTS 2658586 7/1977 Fed. Rep. of Germany .
2031116 11/1970 France .

Primary Examiner—Leonard D. Christian
Attorney, Agent, or Firm—Wenderoth, Lind & Ponack

[57] ABSTRACT

A tape cassette adapter which is useful for a tape recording and/or reproducing apparatus such as a video tape recorder and draws a tape out of a compact cassette by the movement of a tape drawing mechanism from an inoperative position to an operative position. The tape cassette adapter comprises an engaging member which engages to rotate synchronously with a take-up reel drive shaft of the standard size magnetic tape cassette apparatus, a take-up reel drive mechanism for rotating the take-up reel of the compact cassette, and a joint mechanism of rotational power transmission between the rotational member and the take-up reel drive mechanism. Consequently the tape cassette adapter is able to be mounted on apparatuses smoothly, even if the position of the take-up reel drive shaft deviates from a standard position.

20 Claims, 7 Drawing Figures

TAPE CASSETTE ADAPTER

BACKGROUND OF THE INVENTION

1. Field of the Invention

This invention relates to a tape cassette adapter and more particularly to a tape casette adapter which is useful for a tape recording and/or reproducing apparatus such as an audio tape recorder and a video tape recorder. Still more particularly, the present invention relates to a tape cassette adapter which is adaptable for standard size magnetic tape cassette apparatuses and is available for a small size magnetic tape cassette having a small reel length, a so-called compact tape cassette.

2. DESCRIPTION OF THE PRIOR ART

It is well known that there are standard size magnetic tape cassette apparatuses which are adaptable to the standard size tape cassette having a long length tape for long recording and reproducing, and that there are small size magnetic tape cassette apparatuses which are adaptable to compact tape cassettes having a short length tape. The latter is useful for out-door recording because of its small size and light weight. The tape widths for the compact tape cassette and the standard size tape cassette are the same. As video tape recorders are now widespread among the general public, it is required that information recorded in the compact tape cassettes be reproduced with standard size magnetic tape apparatuses such as video tape recorders. But conventional magnetic tape apparatuses are not applicable for such a purpose, because the distance between reel drive shafts of the standard size magnetic tape cassette apparatus is not equal to that of compact cassettes.

A tape cassette adapter has been developed for using compact tape cassettes on standard size magnetic tape cassette apparatuses. Concerning standard size magnetic tape cassette apparatuses, the reel position deviates from a predetermined position because of errors such as machining or assembly errors, whereas the position of the standard size magnetic tape cassette reel is designed to be free so that it can be mounted on the standard size magnetic tape apparatus. Conventional tape cassette adapters do not have a mechanism for absorption of this kind of error. Because the distance between the two reel turntables of the standard size magnetic tape apparatus is not precise, drive motion in the tape cassette adapter for rotating the reels of compact tape cassettes is not smooth.

SUMMARY OF THE INVENTION

Therefore, an object of the present invention is to provide a tape cassette adapter which can be mounted on a standard size magnetic tape apparatus in which reel distance deviates.

Another object of the present invention is to provide a tape cassette adapter which winds up the magnetic tape using little power.

Still another object of the present invention is to provide a tape cassette adapter wherein loss of transmitted torque for rotating the take-up reel is low.

A further object of the present invention is to provide a tape cassette adapter which can rotate reels of compact tape cassettes smoothly and certainly. These objects can be accomplished by a tape cassette adapter described in the appended claims. The above and other objects, features and advantages of the present invention will become more apparent from the following detailed description considered in connection with the accompanying drawings.

DETAILED DESCRIPTION OF THE PREFERRED EMBODIMENTS

Figure 1:
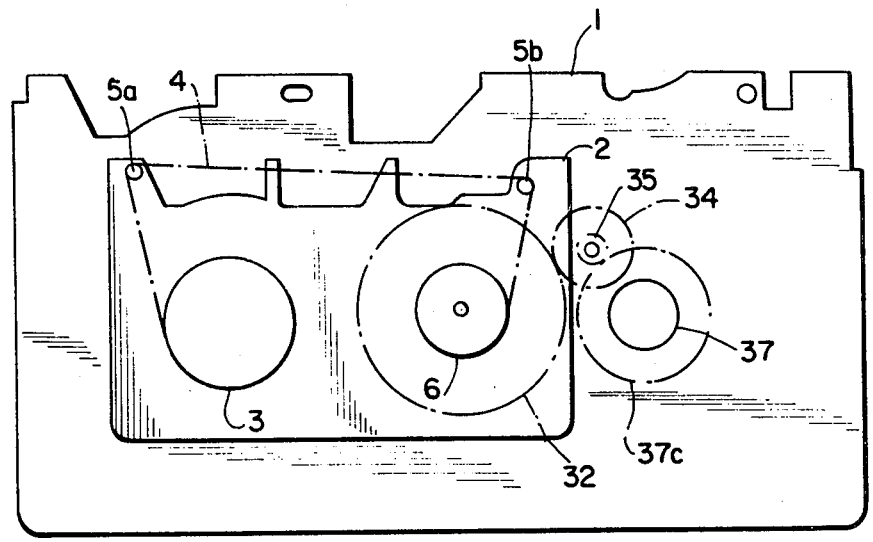
FIG. 1 is a schematic construction view of a tape cassette adapter.

Referring now to the drawings, embodiments of a tape cassette adapter according to the present invention will be described in detail hereinafter.

Figure 2:
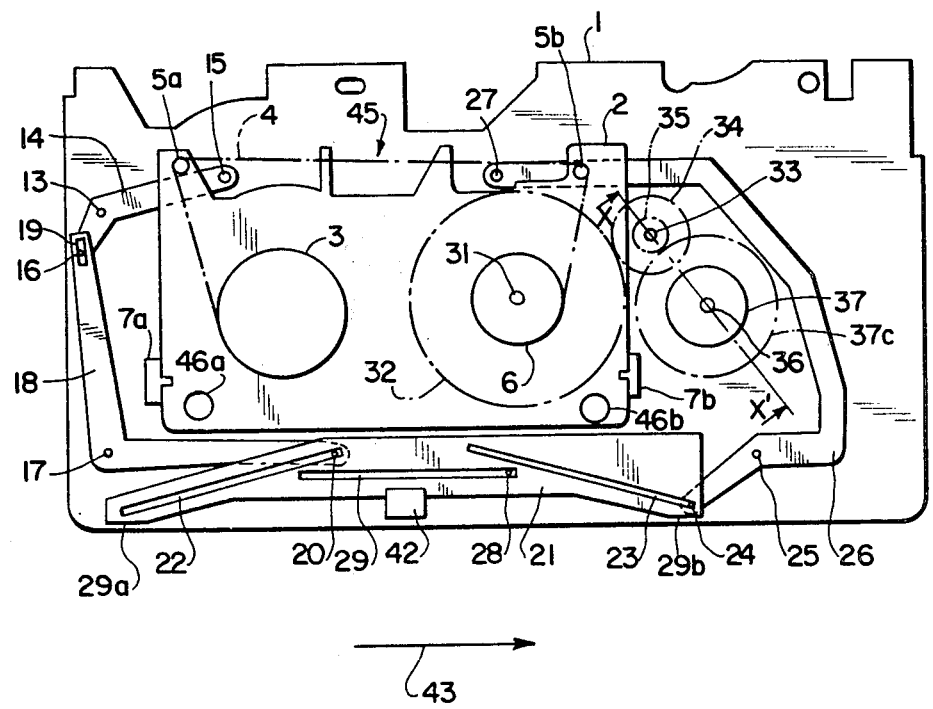
FIG. 2 is a schematic construction view of an embodiment of a tape cassette adapter of the present invention.

As shown in FIG. 1 and FIG. 2, the apparatus in which the compact tape cassette can be received into the same size case of the standard size tape cassette is generally called a tape cassette adapter, and a general tape loading mechanism is shown in FIG. 2. A compact tape cassette 2 is set on a chassis 1. The compact tape cassette 2 having two tape locator holes is positioned by two locator pins 46a, 46b provided on the chassis 1. The compact tape cassette 2 includes a magnetic tape 4 wound on and extending between a supply reel 3 and a take-up reel 6 which are rotatably mounted in the cassette 2. A compact cassette gear 32 provided on the take-up reel 6 of the compact tape cassette 2 engages with a reel gear 37c provided on a take-up drive wheel 37 through an idle gear 34 and an idle gear 35. The take-up drive wheel 37 having the reel gear 37c is rotatably mounted on a shaft 36 on the chassis 1. When the take-up drive wheel 37 is mounted on a take-up reel turntable (not shown) of the standard size magnetic tape apparatus, they engage and rotate synchronously. An opening 45 is formed on the compact cassette 2 for drawing the magnetic tape 4 out of the cassette 2. The magnetic tape 4 is extended from the supply reel 3 to the take-up reel 6 through tape guides 5a and 5b. The compact tape cassette 2 is guided at a predetermined position by guide members 7a and 7b. One end of a first tape loading arm 14 turnably mounted on a shaft 13 has a first tape guide pole (or roller) 15 secured thereto. The first tape guide pole 15 draws the magnetic tape 4 out of the compact tape cassette 2 a counterclockwise turn of the first tape loading arm 14. The other end of the first tape loading arm 14 has a drive pin 16 secured thereto. The drive pin 16 engages with a slot 19 formed on one end of a middle arm 18 turnably mounted on a shaft 17. The other end of the middle arm 18 has a drive pin 20 secured thereto. The drive pin 20 is slidably inserted into a first cam groove 22 provided on an operation rod 21. The operation rod 21 has a second cam groove 23. A drive pin 24 is slidably inserted into a second cam groove 23 and is connected to one end of a second tape loading arm 26 which is turnably mounted on a shaft 25. The other end of the second tape loading arm 26 has a second tape guide pole (or roller) 27 secured thereto.

The second tape guide pole 27 draws the magnetic tape 4 out of the compact tape cassette 2 a clockwise turn of the second tape loading arm 26. The operation rod 21 is slidably guided by a guide groove 29, a guide pin 28 inserted into the guide groove 29 and a suitable guide means comprising side edges 29a and 29b of the operation rod 21.

The reel drive mechanism of a compact tape cassette according to the present invention will be described hereinafter with reference to FIG. 2. The take up reel 6 having the compact cassette gear 32 is rotatably mounted on a shaft 31 secured thereto. The compact cassette gear 32 engages with the idle gear 34 rotatably mounted on a shaft 33. The idle gear 34 also includes the idle gear 35. When the take-up drive wheel 37 mounted on the shaft 36 on the take up reel turntable (not shown) rotates, the magnetic tape 4 is wound up onto the take up reel 6 by the gears 32, 34, 35 and 37c. But if the position of the take up reel turntable (not shown) of the standard size magnetic tape apparatus deviates from its regular position, the distance between the reel gear 37c and the idle gear 35 is changed. Consequently rotation of the reel gear 37c engaged with the idle gear 35 is not transferred smoothly and certainly to the compact cassette gear 32.

The reel drive mechanism of this invention which uses a joint mechanism of rotational power transmission will become apparent from the following detailed description and then the above problem will be solved.

Figure 3:
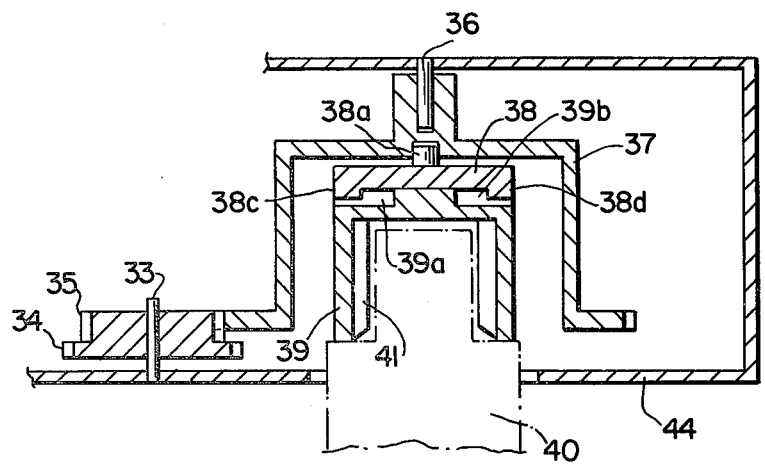
FIG. 3 is a cross section of an embodiment of a joint mechanism of rotational power transmission shown by the long and short dashed line XX' in FIG. 2.

FIG. 3 shows a cross section of an embodiment of the joint mechanism of this invention. The take-up drive wheel 37 is rotatably mounted on a shaft 36, which is secured to the upper part of a case 44. The take-up drive wheel 37 engages with the idle gear 35.

Figure 4:
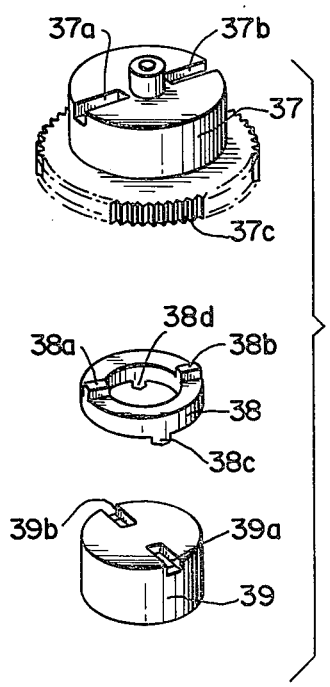
FIG. 4 is exploded oblique plan view of the joint mechanism in FIG. 3.

FIG. 4 shows an exploded oblique plan view of the joint mechanism in FIG. 3. Two grooves 37a and 37b are provided on the upper part of the take-up drive wheel 37. Two projections 38a and 38b of square shape provided on the upper part of a slider 38 are slidably inserted into the grooves 37a and 37b. Two projections 38c and 38d of square shape, provided on the under part of the slider 38, are slidably inserted into two grooves 39a and 39b provided on the upper part of a reel drive member 39. The projections 38a and 38b are constructed with the projections 38c and 38d at right angles to each other. The reel drive member 39 engages with a take up reel turntable 40 (shown by a long-and-two-short-dashes line) of the standard magnetic tape apparatus by several drive projections 41 for synchronous rotation.

The reel drive mechanism of this invention which uses another joint mechanism of rotational power transmission will become apparent from the following detailed description.

Figure 5:
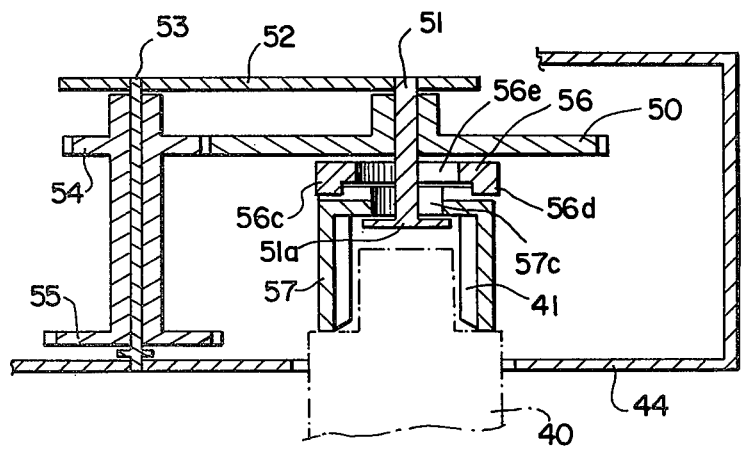
FIG. 5 is a cross section of another embodiment of the joint mechanism of rotational power transmission shown by the long and short dashed line XX' in FIG. 2.

FIG. 5 shows a cross section of another embodiment of the joint mechanism of this invention. A take-up drive wheel 50 is rotatably mounted on a joint shaft 51 having a stopper 51a, which is secured to a plate 52. An idle shaft 53 is secured to the plate 52 and the case 44. An idle gear 54 includes another idle gear 55 and both gears 54 and 55, acting as an unit are rotatably mounted on the idle shaft 53. The take-up drive wheel 50 engages with the idle gear 54. A slider 56 having a thru-hole 56e and a reel drive member 57 having a thru-hole 57c are mounted on the joint shaft 51 rotatably and slidably.

Figure 6:
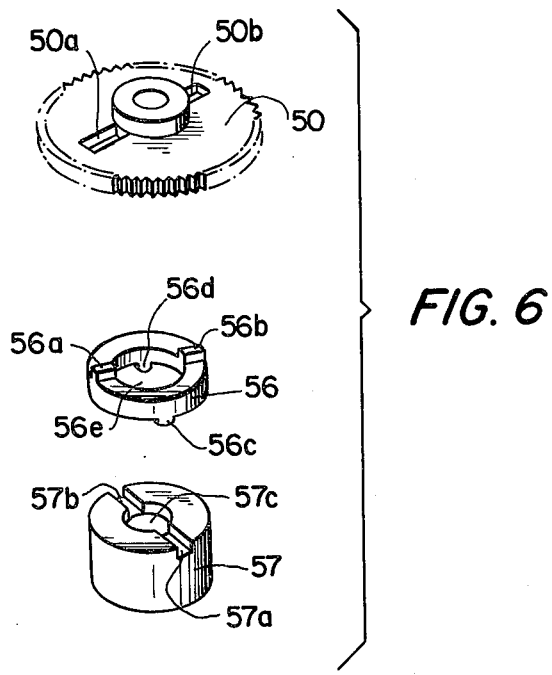
FIG. 6 is an exploded oblique plan view of the joint mechanism in FIG. 5.

FIG. 6 shows an exploded oblique plan view of the joint mechanism in FIG. 5. Two grooves 50a and 50b are provided on the take-up drive wheel 50. Two projections 56a and 56b of square shape, provided on the upper part of the slider 56, are slidably inserted into the grooves 50a and 50b. Two projections 56c and 56d of square shape, provided on the under part of the slider 56, are slidably inserted into two grooves 57a and 57b provided on the upper part of the reel drive member 57. The projections 56a and 56b are constructed with the projections 56c and 56d, shown in both FIGS. 5 and 6 at right angles to each other. The reel drive member 57 engages with the take up reel turntable 40 (shown by a long-and-two-short-dashes line shown in FIG. 5) of the standard magnetic tape apparatus by several drive projections 41, also shown in FIG. 5, for synchronous rotation.

Figure 7:
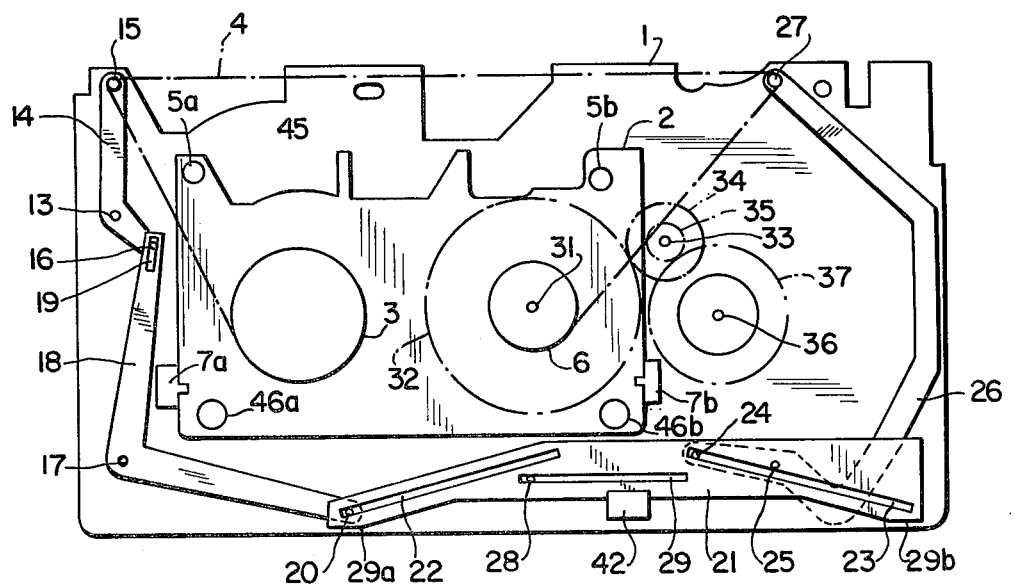
FIG. 7 is a plan view of the embodiment in FIG. 2 in its tape loaded mode.

The operation and the motion of the tape cassette adapter according to the present invention is as follows. As shown in FIG. 2, the compact tape cassette 2 is inserted into the cassette setting space. At this time, the position of the compact tape cassette 2 is decided by two locator pins 46a, 46b. The drive pin 20 which is slidably inserted into the first cam groove 22 provided on the operation rod 21 is driven by sliding of an operation knob 42 in the direction of the arrow 43 (the longitudinal direction of the tape cassette adapter). Consequently, the first tape loading arm 14 is turned through the middle arm 18 so as to draw the magnetic tape 4 out of the compact tape cassette 2 by the first tape guide pole 15 in the manner shown in FIG. 7. In the same way the drive pin 24 which is slidably inserted in the second cam groove 23 is moved and consequently, the second tape loading arm 26 is turned so as to draw the magnetic tape 4 out of the compact tape cassette 2 by the second tape guide pole 27 as shown in FIG. 7. Thus the magnetic tape 4 is drawn onto a desirable tape path on which signals can be recorded and reproduced by the standard size magnetic tape apparatus.

As shown in FIG. 7 the magnetic tape cassette drawn onto the desirable tape path can be mounted on standard size magnetic tape apparatuses. Even if the tape cassette adapter of this invention were mounted on standard size magnetic tape apparatuses in which the position of the drive shaft (not shown) for the supply reel 3 and the position of the take-up reel drive shaft 31 deviate from standard positions, the take up reel turntable 40 can transmit the rotation of the take up drive wheel of the tape cassette adapter smoothly and certainly. Then, as shown in FIGS. 3 and 4, the projections 38a, 38b, 38c and 38d of the slider 38 are inserted into the inside of the grooves 37a, 37b, 39a and 39b and they are displaceable. Needless to say, the idle gears 34 and 35 rotate by the rotation of the take-up drive wheel 37 and the take-up reel 6 of the compact cassette 2 also rotates.

Another improved mechanism shown in FIGS. 5 and 6 can also transmit the rotation of the take up drive wheel 37 smoothly and certainly even if the position of the drive shaft (not shown) of the supply reel 3 and the position of the take-up reel drive shaft 31 deviate from a standard position. Then the projections 56a, 56b, 56c and 56d of the slider 56 are inserted into the inside of the grooves 50a, 50b, 57a and 57b and they are displaceable. Since the slider 56 and the reel drive member 57 are slidably mounted on the joint shaft 51 having the stopper 51a, the joint mechanism is easy to set up and rotation is smooth and certain. Since the idle shaft 53 is located between plate 52 and case 44, the take-up drive wheel 50 and the idle gear 54 engage with each other precisely. The engagement of the idle gear 55 and compact cassette gear 32 is also precise.

Thus the tape cassette adapter of this invention is constructed by the joint mechanism of rotational power transmission which is formed by take-up drive wheel 37, 50, slider 38, 56 and reel drive member 39, 57. The tape cassette adapter of the invention is provided with a take-up reel drive means which drives the take-up reel of the compact cassette (idle gear 34, 35, 54, 55 and take-up drive wheel 37, 50 in the two embodiments) and with an engagement means (reel drive member 39, 57 in the two embodiments) which combines with the take up reel turntable 40 of the standard size magnetic cassette apparatus rotatably.

The tape cassette adapter is also provided with a joint means of rotational power transmission between the engagement means and the take-up reel drive means (slider 38, 56, take-up drive wheel 37, 50 and reel drive member 39, 57 in the two embodiments.)

Consequently, in the case of the standard size magnetic tape cassette apparatus in which the position of the drive shaft (not shown) of the supply reel 3 and the position of the take-up reel drive shaft 31 deviate from a standard position, the tape cassette adapter of the invention can be mounted successfully. The reel drive member 39, 57, the slider 38, 56, and the take-up drive wheel 37, 50 of the tape cassette adapter rotate smoothly and certainly. Loss of transmitted torque for rotating the take-up reel 6 is low. Further if the idle shaft 53 and the joint shaft 51 are secured to the same plate 52 (as shown in FIG.5), the gears 54 and 55 of FIG. 5 are able to contact with their pitch circles during transmission of rotation. Thus the tape cassette adapter can wind up the magnetic tape 4 using little power.

Having described our invention as related to the two embodiments shown in the accompanying drawings it is our intention that the invention be not limited by any of the details of this description, unless otherwise specified, but rather by constructed broadly within its spirit and scope as set out in the accompanying claims.

What is claimed is:

1. A tape cassette adapter for a magnetic tape recording and/or reproducing apparatus comprising:
    a cassette positioning means for positioning a compact tape cassette having a shorter length tape wound on a supply reel and a take-up reel and being smaller in size and lighter in weight than a standard size tape cassette;
    a reel drive means having a first rotating member for driving said take-up reel of said compact tape cassette;
    an engagement means having a second rotating member which has a rotating axis parallel to that of said first rotating member for engaging with a reel turntable of a standard size magnetic tape cassette apparatus for synchronous rotation; and
    a rotation transfer means, having a rotational axis parallel to that of said first rotating member and being positioned between said first rotating member and said second rotating member, for transferring rotational power from said second rotating member to said first rotating member,
    wherein said rotation transfer means has a first engaging portion which slidably engages with said first rotating member in a first direction perpendicular to the rotational axis of said first rotating member for transferring rotational power from said rotation transfer means to said reel drive means.

2. A tape cassette adapter for a magnetic tape recording and/or reproducing apparatus comprising:
    a cassette positioning means for positioning a compact tape cassette having a shorter length tape wound on a supply reel and a take-up reel and being smaller in size and lighter in weight than a standard size tape cassette;
    a reel drive means having a first rotating member for driving said take-up reel of said compact tape cassette;
    an engagement means having a second rotating member which has a rotation axis parallel to that of said first rotating member for engaging with a reel turntable of a standard size magnetic tape cassette apparatus for synchronous rotation; and
    a rotation transfer means, having a rotational axis parallel to that of said first rotating member and being positioned between said first rotating member and said second rotating member, for transferring rotational power from said second rotating member to said first rotating member,
    wherein said rotation transfer means has a second engaging portion which slidably engages with said second rotating member in a second direction perpendicular to the rotational axis of said second rotating member for transferring rotational power from said engagement means to said rotation transfer means.

3. A tape cassette adapter for a magnetic tape recording and/or reproducing apparatus comprising:
    a cassette positioning means for positioning a compact tape cassette having a shorter length tape wound on a supply reel and a take-up reel and being smaller in size and lighter in weight than a standard size tape cassette;
    a reel drive means having a first rotating member for driving said take-up reel of said compact tape cassette;
    an engagement means having a second rotating member which has a rotating axis parallel to that of said first rotating member for engaging with a reel turntable of a standard size magnetic tape cassette apparatus for synchronous rotation; and
    a rotaion transfer means, having a rotational axis parallel to that of said first rotating member and being positioned between said first rotating member and said second rotating member, for transferring rotational power from said second rotating member to said first rotating member,
    wherein said rotation transfer means has a first projection which engages with a first recess formed on said first rotating member and slides in a first direction, and a second projection which engages with a second recess formed on said second rotating member and slides in a second direction, said first direction and said second direction being at right angles to each other.

4. A tape cassette adapter for a magnetic tape recording and/or reproducing apparatus comprising:
    a cassette positioning means provided on a plate for positioning a compact tape cassette, having a shorter length tape wound on a supply reel and a take-up reel, and being smaller in size and lighter in weight than standard size tape cassettes;
    a reel gear provided on the take-up reel;
    a sub-plate parallel to said plate;
    a first shaft provided on the sub-plate;
    a middle gear which rotates on the first shaft and engages with the reel gear;
    a second shaft provided on the sub-plate;

a reel drive gear which rotates on the second shaft and engages with said middle gear;

an engagement means, having a rotating member which has an axis of rotation parallel to that of said reel drive gear, for engaging with a reel turntable of a standard size magnetic tape cassette apparatus for synchronous rotation; and a rotation transfer means, having a rotational axis parallel to that of said first rotating member and positioned between said first rotating member and said second rotating member, for transferring rotational power from said engagement means to said reel drive gear;

wherein said plate has a bore means for locating said first shaft provided on said sub-plate.

5. A tape cassette adapter according to claim 4, wherein said rotation transfer means has a first through-hole for receiving through said second shaft, said engagement means has a second through-hole for receiving through said second shaft, said second shaft being inserted into said first through-hole and said second through-hole has a stopper for stopping axial movement of said engagement means and said rotation transfer means.

6. A tape cassette adapter for a magnetic tape recording and/or reproducing apparatus comprising:

a cassette positioning means for positioning a compact tape cassette having a shorter length tape wound on a supply reel and a take-up reel and being smaller in size and lighter in weight than a standard size tape cassette;

a reel drive means, having a rotating axis and engaged with said take-up reel of said compact tape cassette, for rotating said take-up reel of said compact tape cassette;

a first rotating means, having a rotating axis parallel to that of said reel drive means and engaged with said reel drive means, for rotating said reel drive means;

a second rotating means, having a rotating axis generally parallel to that of said first rotating means and engageable with a reel turntable of a standard size magnetic tape cassette apparatus, for being rotated by said reel turntable of said standard size magnetic tape cassette apparatus; and a rotation transfer means having a rotating axis generally parallel to that of said first rotating means and being positioned between said first rotating means and said second rotating means, said rotation transfer means being slidably engaged with said first rotating means in a first direction perpendicular to the rotational axis of said first rotating means and with said second rotating means in a second direction perpendicular to the rotational axis of said second rotating means, thereby transferring rotational power from said second rotating means to said first rotating means.

7. A tape cassette adapter according to claim 6, wherein said rotation transfer means has a first projection which engages slidably which a first recess formed on said first rotating means in said first direction and a second projection which engages slidably with a second recess formed on said second rotating means in said second direction.

8. A tape cassette adapter according to claim 9, wherein said first direction and said second direction are at right angles to each other.

9. A tape cassette adapter according to claim 6, wherein said first rotating member has a gear portion, and said reel drive means has a gear portion, said gear portion of said first rotating member being engaged with said gear portion of said reel drive means.

10. A tape cassette adapter according to claim 6, further comprising a case for encasing said compact tape cassette, a first shaft secured to a bottom plate of said case for rotatably mounting thereon said reel drive means, and a second shaft secured to a top plate of said case for rotatably mounting thereon said first rotating means.

11. A tape cassette adapter for a magnetic tape recording and/or reproducing apparatus comprising:

a cassette positioning means for positioning a compact tape cassette having a shorter length tape wound on a supply reel and a take-up reel and being smaller in size and lighter in weight than a standard size tape cassette;

a reel drive means, having a rotating axis and engaged with said take-up reel of said compact tape cassette, for rotating said take-up reel of said compact tape cassette;

a first rotating means having a rotating axis parallel to that of said reel drive means and engaged with said reel drive means for rotating said reel drive means;

a second rotating means, having a rotating axis generally parallel to that of said first rotating means and engageable with a reel turntable of a standard size magnetic tape cassette apparatus, for being rotated by said reel turntable of said standard size magnetic tape cassette apparatus;

a rotation transfer means having a rotating axis generally parallel to that of said first rotating means and being positioned between said first rotating means and said second rotating means, said rotation transfer means being slidably engaged with said first rotating means in a first direction perpendicular to the rotational axis of said first rotating means and with said second rotating means in a second direction perpendicular to the rotational axis of said second rotating means, thereby transferring rotational power from said second rotating means to said first rotating means;

a case for encasing said compact cassette tape;

a sub-plate parallel to a bottom plate of said case;

a first shaft secured at an end to said sub-plate for mounting thereon said reel drive means; and a second shaft secured at an end to said sub-plate for mounting thereon said first rotating means.

12. A tape cassette adapter according to claim 11, wherein said first direction and said second direction are at right angles to each other.

13. A tape cassette adapter according to claim 11, wherein said first rotating member has a gear portion, and said reel drive means has a gear portion, said gear portion of said first rotating member being engaged with said gear portion of said reel drive means.

14. A tape cassette adapter according to claim 11, wherein said rotation transfer means has a first center through-hole for inserting therethrough said second shaft, and said second rotating means has a second center through-hole for inserting therethrough said second shaft, said second shaft being inserted through said first and second through-holes and having at the other end a stopper means for preventing axial movement of said rotation transfer means and said second rotating means.

15. A tape cassette adapter according to claim 14, wherein the other end of said first shaft is fitted into a hole provided on said bottom plate of said case.

16. A tape cassette adapter for a magnetic tape recording and/or reproducing apparatus comprising:
- a cassette positioning means for positioning a compact tape, cassette having a shorter length tape wound on a supply reel and a take-up reel and being smaller in size and lighter in weight than a standard size tape cassette;
- a reel drive means, having a rotating axis and engaged with said take-up-reel of said compact tape cassette, for rotating said take-up reel of said compact tape cassette;
- a first rotating means, having a rotating axis parallel to that of said reel drive means and engaged with said reel drive means, for rotating said reel drive means;
- a second rotating means, having a rotating axis generally parallel to that of said first rotating means and engageable with a reel turntable of a standard size magnetic tape cassette apparatus, for being rotated by said reel turntable of said standard size magnetic cassette apparatus; and
- a rotation transfer means having a rotating axis generally parallel to that of said first rotating means and being positioned between said first rotating means and said second rotating means, said rotation transfer means having a first projection which engages slidably with a first recess formed on said first rotating means in said first direction and a second projection which engages slidably with a second recess formed on said second rotating means in said second direction, said first and second direction being at right angles to each other.

17. A tape cassette adapter according to claime 16, further comprising:
- a case means for encasing said compact cassette tape;
- a sub-plate parallel to a bottom plate of said case means;
- a first shaft secured at an end to said sub-plate for mounting thereon said reel drive means; and
- a second shaft secured at an end to said sub-plate for mounting thereon said first rotating means.

18. A tape cassette adapter according to claim 17, wherein said first rotating member has a gear portion, and said reel drive means has a gear portion, said gear portion of said first rotating member being engaged with said gear portion of said reel drive means.

19. A tape cassette adapter according to claim 18, wherein said rotation transfer means has a first center through-hole for inserting therethrough said second shaft, and said second rotating means has a second center through-hole for inserting therethrough said second shaft, said second shaft being inserted through said first and second through-holes and having at the other end a stopper means for preventing axial movement of said rotation transfer means and said second rotating means.

20. A tape cassette adapter according to claim 19, wherein the other end of said first shaft is fitted into a hole provided on said bottom plate of said case means.

* * * * *